Figure 1:
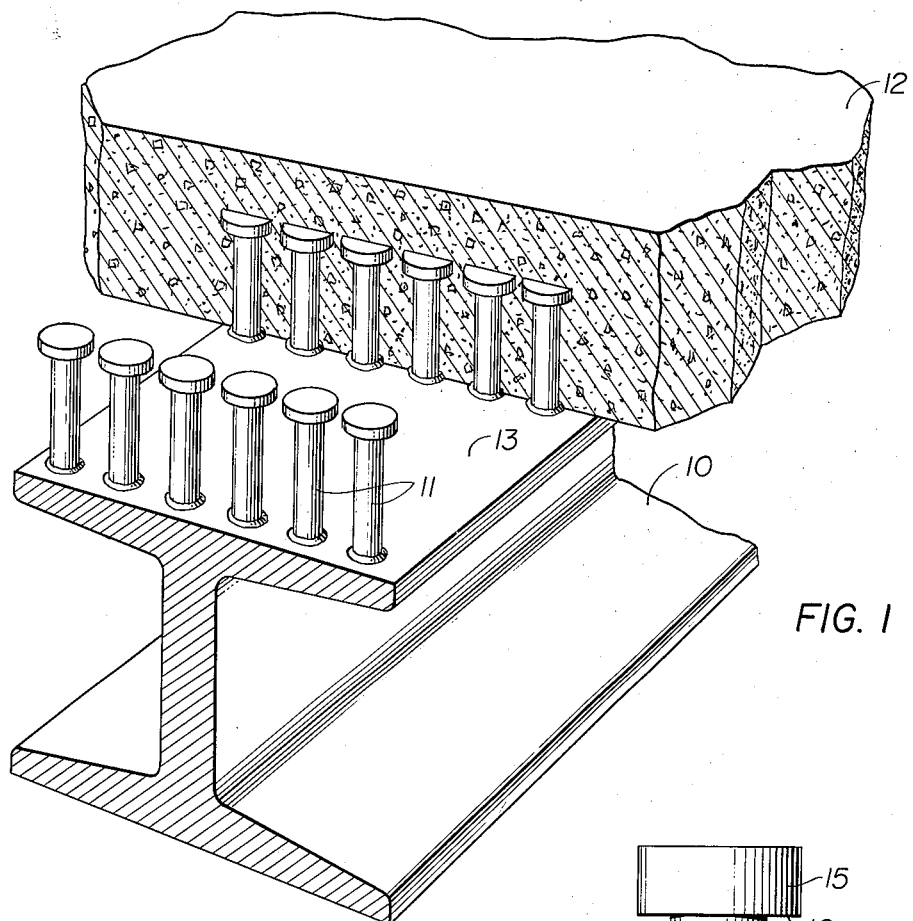

INVENTORS
ROBERT C. SINGLETON
RICHARD E. McGINNIS
BY Pyle & Fisher
ATTORNEYS

United States Patent Office 2,987,855
Patented June 13, 1961

2,987,855
COMPOSITE T-BEAM
Robert C. Singleton and Richard E. McGinnis, Oberlin, Ohio, assignors to Gregory Industries, Inc.
Filed July 18, 1958, Ser. No. 749,393
4 Claims. (Cl. 50—290)

This invention relates in general to structural beam formations, and relates in particular to the construction of a composite beam employing steel for tensile strength and concrete for compression strength at low cost.

This application is a continuation-in-part of Serial No. 491,498, filed March 1, 1955, and now abandoned.

One of the principal objects of this invention is to provide a tie between a metal and a concrete portion of a composite construction, which tie is capable of resisting stress applied from any direction.

Another of the principal objects of this invention is to provide a novel and improved composite beam in which anchors in the form of studs are end arc welded to a steel beam to provide anchors for fixing a concrete slab portion of the composite beam to the steel beam without weakening the steel beam.

Another object of the invention is to provide a novel and improved composite beam structure in which novel end arc welded anchoring studs are concentrated in high stress areas to provide maximum composite beam strength in a beam of any given size and weight.

Therefore, another principal object of this invention is to provide a composite beam with any needed quantity of shear connector capacity without distortion due to welding stresses, thus enabling beam design to print specifications with a minimum of difficulty.

Another object of this invention is to provide a shear connector construction which can be secured at random and yet develop all the required shear to thereby more evenly distribute the load over the beam.

And another object of this invention is to provide a composite beam construction having all the securing capacity which may be theoretically required.

Still another object of the invention is to provide a novel and improved anchor mechanism in a composite beam in which anchor studs are end arc welded to the steel portion of the beam providing an intermingling of the stud and beam metal over the entire cross section of the stud and thereby providing maximum strength for an anchor of any given cross-sectional area.

Composite beam construction is not new. It is well known that any beam subjected to lateral load will strain in compression directly under the load and will strain in tension at the side of the beam opposite the load. Somewhere between these two extremes will be a zero strain area. A beam may be mathematically calculated to determine each zero strain area and the beam then constructed compositely of steel in the tensile area and of concrete in the compression area. However, in order to produce such a beam which will carry out such a theoretical function, for which it was designed, the composite beam must be truly composite and the concrete may not be permitted to move relative to the contacting steel surface. As little as .003 inch of residual movement will destroy the composite action of the beam. Thus, it has long been taught that massive and elaborate shear connectors were necessary in order to present broad faces to the concrete and thus block any such movement. U.S. Patent No. 2,340,176, issued to C. P. Cueni et al. in 1944, is an example of one type of extremely complex shear connector system. Prior to Cueni et al., Young in Patent No. 1,922,340, issued in 1933, attempted to connect concrete to steel by means of pins driven into holes drilled in the steel beam. Young accomplished little more than to weaken the steel portion of the beam by the necessary holes. In order to place shear connectors in close enough relationship to sufficiently bind the concrete slab to the steel, the number of holes it would be necessary to drill would materially weaken the steel portion of the beam by causing stress concentration points.

A comparison of some prior art composite construction problems and their solution by the present invention may be made as follows:

A. Cambering of the beam and then welding of anchors to the beam is difficult because conventional flame or arc welding causes warpage to the extent that the beam often needs to be cambered again. Such non-warpage is an extremely important feature of the present invention. Acceptance of beam construction was slow prior to the present invention for the reason that the excessive amount of welding heat required by all known prior devices so warped the beams that if they were cambered prior to fitting of the shear connectors, then the beam would have to be re-cambered after the welders finished. Hence, the use of prior devices has always caused a large extra expense which has discouraged the full development of this construction. Such unnecessary financial burden is relieved by the present invention. Now, with the teaching of the present invention, composite beam construction is being accepted in State after State and across the Nation, as well as by countries foreign to the United States. Beams may be properly cambered and expected to remain so after the shear connectors are installed according to the present invention.

This feature of the invention enables the cambered beams to be placed in the field and the necessary concrete forms and reinforcing bars installed prior to attaching the shear connectors. Therefore, workmen can proceed without the difficulty of stumbling about on massive connectors which had to be pre-installed according to prior practice.

B. In prior connector devices it was difficult to fill over and around them thoroughly.

Stress transferred from concrete to steel may be mathematically, exactly, determined so that no stress concentration will be produced. With this invention shear connectors can be set almost solid at high stress areas, whereas the prior art type of channels or spirals, and like massive connectors cannot be spaced closely enough to get the necessary shear strength and still have room to weld and fill with concrete connecting parts.

C. Prior flame welding techniques caused undue stresses and strains in the steel portion of the beam which weakened the beam.

Theoretically, the cylindrical stud which is the preferred embodiment of the present invention should be a cleavage point which will tend to crush the concrete and allow the prohibitive, relative movement. However, it has been learned that no deterioration of the concrete takes place around the connectors and it is theorized that the reason for the absence of theoretically expected deterioration is the fact that these connectors of minimum area allow a maximum amount of concrete to extend uninterrupted from end to end of the beam. The stress, therefore, is concentrated in the concrete and there is little tendency for an individual connector to shear the concrete. Therefore, the increased strength achieved by the present invention may be likened to the increased strength which has readily been accomplished in gray iron by nodularized cast iron.

D. One of the more important advantages of this invention is the ability of the connector to take stress in all directions. Prior devices are directional in character. The very characteristic of the cylindrical form which provides continuous concrete also provides the ability to take stress in all directions.

This characteristic is valuable in bridge construction to resist side forces from wind, for example. But of greater importance is the construction of area beams such as tank roofs. It is virtually impossible to provide proper orientation of bulb irons and similar directional members in such area beam, but the improved connector of this invention may be employed with assurance that the stress is resisted regardless of its direction.

Figure 2:
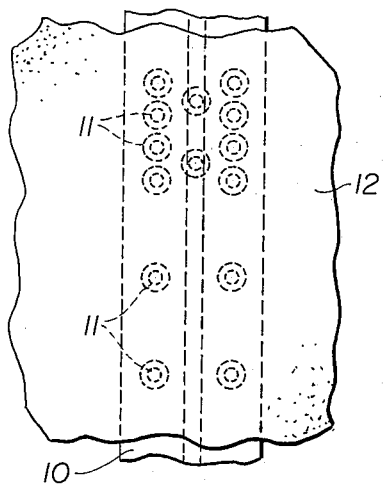
Figure 3:
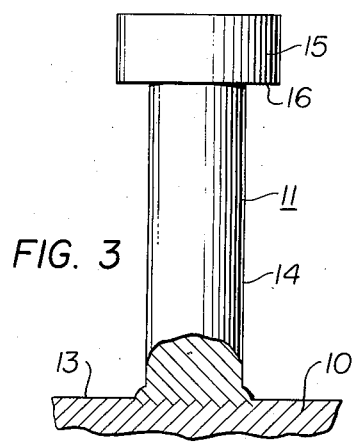

Other objects and a fuller understanding of the invention may be had by referring to the following description and claims, taken in conjunction with the accompanying drawings, in which:

FIGURE 1 is an isomatic fragmentary view of a composite beam construction;

FIGURE 2 is a top fragmentary plan view of a portion of a composite beam wherein shear connector members are concentrated in one segment of the beam to illustrate the ability to design extra shear connector strength into concentrated areas when needed; and, FIGURE 3 is a fragmentary view on an enlarged scale with respect to the other drawings and partly in section showing one of the novel and improved concrete anchors fastened to a fragment of a steel beam.

For several years the composite type construction has been increasing in usage in nearly all parts of the United States and Canada. In bridge construction, the characteristics of the bridge in the way of reduced clearance requirements, increased rigidity and lighter weight have always been desirable. Now, with the current increase in access causeway, grade separation and bridge construction, these features are even more attractive. Building construction is, of course, benefitted in like manner. One particular building-type structure which illustrates the advantages of this invention is domed underground jet fuel tanks. In such environment, the stress on shear connectors may, and does, act from any and all directions. Hence, the ability of the connector of the present invention to take such stresses in any direction is the only reason such composite beam roof structure is successful. Other prior art connectors are not economically acceptable.

There are several sources of possible cost reduction through the use of this design. Prior to this invention, it has not been possible to take full advantage of the economies made available by the composite type construction, primarily because of the high cost of installing shear connectors either in the shop or in the field.

The ability to place studs at random, together with the fact that the stud is able to take stress in any direction and is universally oriented permits an improved relationship of connector and reinforcing bars in such a manner that the construction of skew bridges is dramatically improved. In simplest form, a bridge crosses a valley or river at right angles and hence the bridge construction is square and straight. Conventional prior art lug and spiral shear connectors then can be used and present no problem with respect to the placement of reinforcement steel. However, most bridges cross at something other than a normal angle and hence are skewed. Usually the steel beam members are placed in something other than right-angular relationship. Hence, with lugs and spirals, it is necessary to contrive unusual reinforcement bar forms at the ends of the bridge.

With the connectors of the present invention, no problems are involved because conventional size and form of reinforcement members are employed and all of them are placed at a skewed angle completely along the bridge. Lugs and spirals cannot be placed in such arbitrary manner and hence this invention materially aids in overcoming such special reinforcement problems.

According to this invention, it was contemplated that the absolute union of concrete and steel to a degree that would hold relative slippage within acceptable limits would be possible by means of securing of the new type shear connector in the manner set forth in this specification. The portability of the welding tool and speed of the method made this approach a most interesting one from the fabricator's and contractor's point of view.

To evaluate the invention technically, the problem was turned over to a well-known research authority on composite type construction and shear connectors at the University of Illinois. Thus, a design of stud considered to be satisfactory for use as a shear connector was developed.

Push-out specimens containing stud welded shear connectors were prepared and tested. The stud welded connector was found to be satisfactory and to have characteristics superior to those of channel shear connectors. (For description of the test of flexible channel connectors, see "Studies of Slab and Beam Highway Bridges, Part IV: Full-Scale Tests of Channel Shear Connectors and Composite T-Beams," by I. M. Viest, C. P. Siess, J. H. Appleton and N. M. Newmark, University of Illinois, Engineering Experiment Station Bulletin Number 405, 1952.)

The drawings illustrate an embodiment of the invention in the form of a single section of an I-beam with concrete cast thereon to form a composite beam. A plurality of these composite beams may be used to form a complete floor of a bridge, roadway, roof dome, or other part of a building. Further, metal members of other shapes and sizes may be used, and the concrete slab may contain strengthening devices such as reinforcing rods or wire mesh.

The composite beam illustrated in FIGURES 1 and 2 comprises an elongated I-beam 10. A plurality of anchor members or studs 11 are shown which have been end arc welded to the beam 10. A concrete slab 12 has been cast on the beam and around the anchors 11.

As illustrated in FIGURE 3, the anchor studs 11 are welded to the surface 13 of the I-beam 10 such that each of them extends outwardly generally normal to the supporting surface. The anchors 11 are spaced at predetermined intervals across and along the surface 13 of the I-beam 10. The interval depends on the specific use and strength required from the composite beam. The fact that the interval can be fully selected is a major accomplishment of this invention.

Each anchor or stud 11 of the illustrated embodiment consists of a post portion 14 and a head 15. The head may be applied in any manner, such as by heading operations or screw thread. The post portion 14 and the head 15 are each substantially cylindrical in shape and the head 15 has a larger diameter than the post portion to define a shoulder 16. The studs 11 are end arc welded to the surface 13 by any suitable manner such as that illustrated and described in the United States Nelson Patent No. Re. 22,411 of December 24, 1946.

The entire cross section of the post portion 14 is welded and thus united to the I-beam 10 as is best illustrated in FIGURE 3. After a plurality of these studs 11 have been end arc welded to the surface 13 of the I-beam 10, the concrete slab 12 is poured. The concrete slab completely fills in around the fastening members 11 and under the heads 15 thereof. Whether the I-beam 10 is supported until the concrete portion hardens, is a matter of personal preference.

The end arc welding of the studs 11 to the beam surface 13 materially contributes to several of the outstanding advantages of this invention. Since the temperature resulting from the arc is uniform about the entire circular contact area of the stud and steel beam portion, any stresses induced in the steel beam by the weld temperature are set up in a concentric pattern about the axis of the stud. Further, since end arc welding is employed, the heat is only momentary and therefore the induced stresses are minimized. This construction has an additional advantage in that the weld extends over the entire cross-sectional area of the post portion and it consists of clean intermingled weld metal of the connector and beam metal alone. The net result is: (1) a stronger bond since the bond is over the entire cross-sectional area of contact; (2) a stronger composite beam since the steel beam is not weakened by the welding operation; and (3) an anchor for the concrete which has equal resistance to stresses in all directions. Further, because of the increased efficiency of the anchors and because the steel beam is not weakened by connection of the anchors, the arrangement of the fasteners is considerably more flexible than prior art arrangements. The fasteners may be located at areas of stress concentration, thereby providing maximum strength with a minimum overall beam weight and a minimum number of anchor studs.

Throughout this specification, the composite construction is sometimes referred to as a composite beam construction. Reference is made in this manner because of the function rather than the physical appearance. Hence, large plates for decks and roofs are sometimes referred to as beam construction.

In its physical embodiment the preferred form of the invention is embodied in a cylindrical stud which is provided with a larger wafer shaped head with the stud end arc welded to the surface of the steel beam with no foreign weld material employed. Intermingling of the material of the stud and the steel beam at the area of contact provides strength sufficient for the task, whereas prior art devices enabled welds to supply a bond only along the peripheral edge of the connector. Furthermore, the stresses that are produced by the present invention are believed to have a circular pattern around the stud which diminishes with distance from the stud, and hence produces uniform dispersion of such stresses without undue concentration.

Through this construction, the concrete and steel are tied together more strongly than prior art connections, and stress concentrations are avoided. Further, no foreign weld or other fastening material is needed nor is a highly skilled mechanic needed to connect the studs to the beam.

Although the invention has been described in its preferred form with a certain degree of particularity in order to set forth one embodiment of many possible means for causing the application of a plurality of separate proper impact forces, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In steel and concrete composite construction of the type used in bridge building and having a metal beam forming a base portion and metal connector members welded to the metal base and embedded in the concrete for securing the concrete slab to the base against horizontal shear and relative vertical movement, that improvement which comprises a plurality of connector members in the form of cylindrical studs each having is base end arc welded to and its axis generally normal to said metal base, said welding extending over but being substantially confined to the entire cross sectional area of the base of each stud, the shape and cross sectional area of said end welded studs permitting same to be spaced at random but relatively close together and still permit easy compaction and flow of concrete around and between the studs whereby all vertical surfaces of each stud are in effective contact with the surrounding concrete, the height and cross sectional area and random positioning of said cylindrical studs being sufficient to resist horizontal shear from any direction, at least some of said studs having head portions of larger cross sectional area whereby to anchor the concrete against relative vertical movement.

2. The structure called for by claim 1, wherein the greater length of each stud is circular and of the same diameter.

3. The structure called for by claim 2, wherein the vertical axes of any two adjacent studs are spaced apart at least twice said diameter.

4. The structure called for by claim 1, wherein a plurality of studs are end welded to the beam in alignment transversely of the beam.

References Cited in the file of this patent

UNITED STATES PATENTS

| | | |
|---|---|---|
| Re. 22,411 | Nelson | Dec. 21, 1946 |
| 1,662,896 | Pawling | Mar. 20, 1928 |
| 1,922,340 | Young | Aug. 15, 1933 |
| 2,016,616 | Schaub | Oct. 8, 1935 |
| 2,319,049 | Fischer | May 11, 1943 |
| 2,340,176 | Cueni et al. | Jan. 25, 1944 |
| 2,562,601 | Caquot et al. | July 31, 1951 |